Nov. 11, 1947.     W. G. MITCHELL     2,430,527
PLASTIC HANDLE SECURING MEANS FOR DRILLS
Filed Sept. 13, 1944
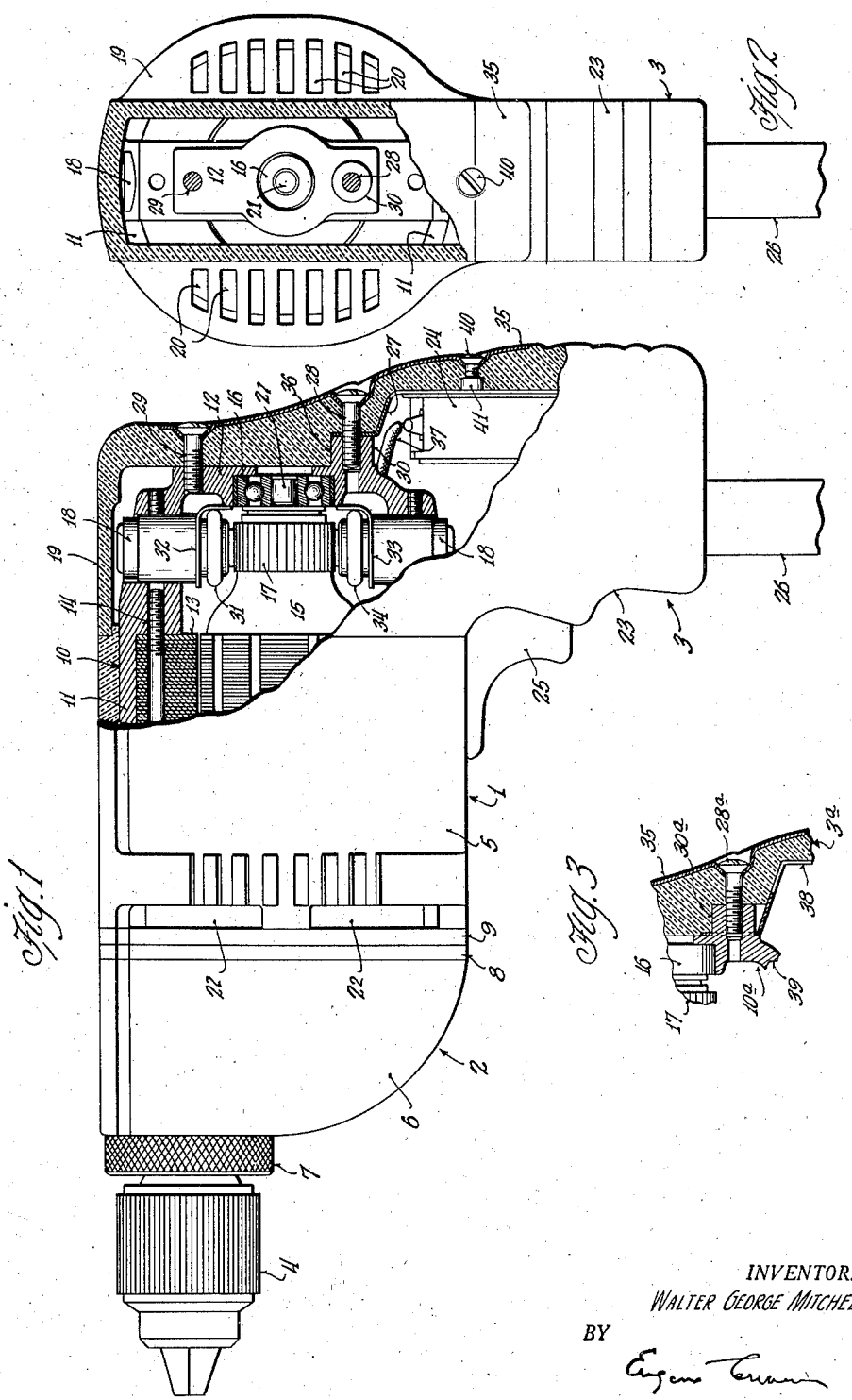
INVENTOR.
WALTER GEORGE MITCHELL
BY
ATTORNEY.

Patented Nov. 11, 1947

2,430,527

UNITED STATES PATENT OFFICE 2,430,527

PLASTIC HANDLE SECURING MEANS FOR DRILLS

Walter George Mitchell, Aurora, Ill., assignor to Independent Pneumatic Tool Company, Chicago, Ill., a corporation of Delaware Application September 13, 1944, Serial No. 553,950

6 Claims. (Cl. 172—36)

This invention relates to improvements in handle securing means for plastic handles of portable electric tools of the character disclosed in my co-pending applications Serial Nos. 462,244, filed October 16, 1942, and 497,008, filed August 2, 1943, the former application having issued into Patent No. 2,373,842 on April 17, 1945.

In these tools, the plastic handle member is secured by screws or equivalent fasteners, to the U-shaped metal frame which supports the driving motor within the tool. These screws are engaged in tapped openings in the metal frame and have their headed outer ends drawn tightly against the handle member or a thin metal pressure distributing plate on the outerside of the handle member to clamp the same to the motor supporting frame.

In both co-pending applications, the shape of the handle member increases the thickness of the handle material at the screws, the thickness at the lower screw being greater than at the upper screw. This makes it necessary to use screws of different lengths, the upper screw being shorter than the lower screw. Also, these screws extend into tapped openings in the frame directly opposite the brush units which are mounted in the frame for the commutator of the motor. Hence, the screws are likely to be run into contact with the live parts of the brush units and produce short circuiting of the motor should the screws be unduly tightened in securing the handle to the frame.

The objects of the present invention are twofold, first, to provide the frame with a rearwardly extending lug for the lower screw to permit screws of substantially the same length to be used for securing the handle to the frame, and, second, to provide by the lug an increased inside surface on the handle member which surface in conjunction with the outside pressure distributing plate reduces the unit pressure imposed on the plastic material by the screws in securing the handle member to the frame to an extent sufficient to prevent the screws being run into contact with the brush units to short circuit the tool motor.

The invention consists further in the structural organization hereinafter described and claimed.

In the accompanying drawings—

Fig. 1 is a side view of a portable motor driven drill with parts broken away and in section, respectively, to show the improved handle fastening means of my instant invention; and Fig. 2 is an end view of the drill similarly depicted to further illustrate the fastening means; and Fig. 3 is a sectional view showing a modified form of construction to be later described.

The tool illustrated comprises a motor section 1, a gear reducing section 2, and a handle section 3. These sections are secured together in the assembled relation shown and contain the operative parts of the tool. The chuck 4 which is at the front end of the tool is on its rotary driving spindle (not shown). The cover elements 5, 6 for the respective motor and gear reducing sections 1 and 2 and the handle member 3 are each comprised of a relatively light and inexpensive plastic material molded to the shape and size required for the parts. The handle 3, which is at the rear end of the tool, holds the cover 5 in place, while a nut 7 at the front end of the tool about the spindle performs the same function for the reducing gear cover 6. The nut 7 screws on the reducing gear frame and clamps the cover 6 against its base wall 8, the gear frame supporting the tool spindle and the gears which drive it from the shaft of the tool motor. These details are shown in my co-pending application Serial No. 462,244. The handle member 3 overlaps and abuts against the rear end of the motor cover 5 and holds the same against a ring-flange 9 at the front end of the frame 10 as indicated herein. The motor and gear reducing sections 1 and 2 are secured together by screws at these wall and flange portions 8 and 9, respectively.

The frame 10 is of metal in U-shaped skeleton form having substantially parallel upper and lower arm portions 11, 11 rigidly joined together at the opposite ends of the frame by the flange 9 at the front end and by a cross or web-wall 12 at the rear end.

The electric driving motor for the tool is located within the frame 10, the laminated stator 13 of the motor being directly supported by the frame arms as shown. The stator 13 is releasable through a side of the frame 10 in the manner disclosed in my co-pending application Serial No. 462,244. Parts of the mounting include fastening screws, the inner ends 14 of which engage in tapped openings in the frame arms as depicted herein.

The armature 15 of the motor is journalled in the tool structure in front and rear anti-friction bearing units, the rear one 16 being mounted in the web-wall 12 of the frame 10 as shown in Fig. 1. The front bearing unit (not shown) is mounted in the gear frame adjacent its base wall 8 as shown in my co-pending application Serial No. 462,244. The commutator 17 of the armature 15 is adjacent to the rear bearing 16 and is engaged by the spring urged carbon elements of the motor brush units 18, 18 supported in the frame arms 11 above and below the commutator.

The handle section 3 is hollow having an upper portion 19 shaped to provide a cover for the open rear end of the motor section 1 and fitting over the rear end of the frame 10. This cover section 19 encloses the brush units 18 and is provided with slots 20 for the intake of air into the motor section for cooling the motor. This air circulating arrangement includes a rotary fan (not shown) at the front end of the motor section 1 and mounted on and driven by the armature shaft 21. Here, the cover 5 has air discharge openings 22 for the fan.

The lower portion 23 of the handle member 3 is in the form of a pistol grip and is the part of the handle member which is grasped by the operator for holding and manipulating the tool. This lower portion 23 extends below the motor section 1 and mounts a switch device 24 and its actuating trigger block 25. Pressing the latter inwardly closes the switch and operates the tool motor, the current supply being through a cable 26 secured to and extending into the handle. Releasing the trigger opens the switch and stops the motor.

The mounting for the switch device includes a metal bracket strip 27 located within the handle portion 23 and secured to the end wall 12 of the frame 10 by a screw member 28. This screw member 28 also serves to secure the handle member 3 to the frame 10 and there is an upper screw 29 for the same purpose as shown in Fig. 1. The screws 28, 29 engage in tapped openings in the frame wall 12 on opposite sides of the motor axis as shown.

The shape of the handle member 3 increases in thickness at the lower screw. This in the handle securing arrangement shown in my co-pending applications makes it necessary to use screws of different lengths, the lower screw being longer than the upper one. To provide for the use of screws of substantially the same length to facilitate assembling of these tools, I provide the frame wall 12 with a rearwardly extending lug 30 for the lower screw. This lug is cast integral with the frame 10 and extends therefrom a distance equal to approximately half the thickness of the handle member at the location of the lower screw. In practice, the lug 30 reduces the thickness of the handle section to substantially the same thickness as at the upper screw. This makes the two screws about the same length as shown. And also, both screws have about the same normal clamping pressure on the handle member.

It will be noted that the tapped opening for the upper screw 29 extends entirely through the end wall 12 and if the upper screw were unduly tightened, it could be brought into contact with the hard fiber cylinder which insulates the upper brush cartridge from the frame 10. To avoid any possible contact of the screw 29 with the live coil spring connecter 31 on the upper brush holder, the spring is protected by a flat fiber piece 32 fitted on the brush holder and having a turned down section over the spring as shown. A similar insulation piece 33 is mounted on the lower brush unit and has an upstanding portion covering the live coil spring connecter 34 on said brush unit. The opening in the lug 30 is tapped to the extent of the lug and not through the frame wall 12. Hence, the screw 28 will not likely be brought into contact with said live coil spring to short circuit the tool motor. Ordinarily, the untapped portion of this opening will resist the screw and apprise the operator tightening the screw that unsafe limits had been reached.

A metal plate 35 is applied on the rear side of the handle member 3 to distribute the clamping pressure of the screws on the plastic to avoid cold flowing of the material as disclosed and claimed in my co-pending application Serial No. 497,008. The lug 30 fits in a recess 36 in the handle member 3 and by this arrangement the inside surface of the handle member is increased which in conjunction with the plate 35 reduces the unit pressure imposed on the plastic material to lessen the likelihood of the screws being brought into contact with the live parts of the brush holders to short circuit the motor. The motor circuit includes the switch device, 37 indicating a wire leading from the switch to one of the brush units.

In the construction shown in Fig. 1, the upper end of the bracket 27 extends into the recess 36 in the handle section 3 between the base of the recess and the front end of the lug 30 fitting therein. Such bracket end is apertured to receive the screw 28 and the latter when tightened clamps the bracket end between the base of the recess and the outer end of the lug.

In the modified construction shown in Fig. 3, the upper end portion of the bracket strip 38 extends to the web wall 39 of the motor supporting frame 10a at the lug 30a on the frame 10a and seats against the frame about the lug 30a at the base of the same at the frame. This part of the bracket strip 38 has an aperture large enough to pass the lug 30a and is clamped between the frame 10a and the handle section 3a by the lower screw element 28a which extends through the handle member 3a and into the tapped opening in the lug 30a. The remainder of the structure follows the embodiment shown in Figs. 1 and 2.

The switch device 24 is secured in place by a screw element 40 which extends through the handle section 3 and the plate 35 and engages a tapped opening in a lug 41 on the switch casing as shown in Figs. 1 and 2.

The details of construction and arrangement of parts shown and described may be variously changed and modified without departing from the spirit and scope of my invention, except as pointed out in the annexed claims.

I claim as my invention:

1. In a portable electric tool, a frame having an end wall, an electric motor for operating the tool mounted within said frame, a plastic handle member for the tool, a pressure distributing plate on the handle member, screw elements extending through the handle member and said plate and engaging in tapped openings at the end wall for securing the handle member thereto, and a lug on the end wall at one of said tapped openings and containing the same, said lug fitting within a recess in the handle member to increase the inside surface thereof whereby to reduce the unit of pressure imposed on the plastic material by the screws.

2. In a portable electric tool, a frame having an end wall, an electric motor and brush units therefor supported within the frame, a plastic handle member for the tool, screw elements extending through the handle member and engaging in tapped openings at the end wall for securing the handle member thereto, said tapped openings being opposite the brush units, and electrical insulators carried by the brush units in substantial alignment with the screws to guard against any possible contact of the screw elements with the electrically alive parts of the brush units in extending the screws beyond unsafe limits.

3. In a portable electric tool, a frame having an end wall, an electric motor for operating the tool mounted within said frame, a handle member fitting over the frame at its end wall and having a hollow grip portion extending below the frame, upper and lower screw elements extending through the handle member and engaging in tapped openings at said end wall for securing the handle member thereto, a rearwardly extending lug on the end wall extending into a recess in the handle member and containing the tapped opening for the lower screw, a switch device for the motor located in the hollow grip portion of the handle, and a supporting bracket for said switch device within said grip portion and having its upper end portion clamped between the handle member and the outer end of the lug by the lower screw and having an aperture therein to pass the lower screw.

4. In a portable electric tool, a frame having an end wall, an electric motor for operating the tool mounted within said frame, a handle member fitting over the frame at its end wall and having a hollow grip portion extending below the frame, upper and lower screw elements extending through the handle and engaging in tapped openings at said end wall for securing the handle member thereto, a rearwardly extending lug on the end wall extending into a recess in the handle member and containing the tapped opening for the lower screw, a switch device for the motor located in the hollow grip portion of the handle, and a supporting bracket for the switch device within said grip portion and having its upper end portion clamped between the frame and the handle at the base of the lug, said bracket having an aperture therein to pass the lug.

5. In a portable electric tool, an electric motor for operating the tool, a substantially U-shaped skeleton frame for supporting the motor within the tool, said frame having substantially parallel upper and lower arm portions extending lengthwise of the tool and providing direct support for the motor, said frame having an end wall portion extending between and rigidly connected with the upper and lower arm portions at the rear end of the frame, said end wall portion extending crosswise of the tool on opposite sides of the rotary axis of the tool motor supported by the frame, a plastic handle member for the tool, screw elements extending through the handle member into and engaging tapped openings carried by said end wall portion for securing the handle member to the frame, and a lug on the end wall portion of the frame extending rearwardly beyond the same, said lug containing one of the tapped openings and having a length substantially equal to one half the length of the screw elements whereby the latter may be substantially equal in length.

6. In a portable electric tool, an electric motor for operating the tool, a substantially U-shaped skeleton frame for supporting the motor within the tool, said frame having substantially parallel upper and lower arm portions extending lengthwise of the tool and providing direct support for the motor. said frame having an end wall portion extending between and rigidly connected with the upper and lower arm portions at the rear end of the frame, said end wall portion extending cross-wise of the tool on opposite sides of the rotary axis of the tool motor supported by the frame, a plastic handle member for the tool, screw elements extending through said handle member into and engaging tapped openings carried by said end wall portion for securing the handle member to the frame, and a lug on the end wall portion of the frame extending rearwardly beyond the same, said lug containing one of said tapped openings and said handle member having a recess therein to receive the lug, said handle member fitting against the end wall portion of the frame at the upper and lower screw elements, respectively, the fit at the lower screw element being against the outer end of the lug, the thickness of the handle material at said screw elements being substantially equal whereby the screw elements will be approximately equal in length.

WALTER GEORGE MITCHELL.

REFERENCES CITED

The following references are of record in the file of this patent:

UNITED STATES PATENTS

| Number | Name | Date |
| --- | --- | --- |
| 2,072,551 | Forss | Mar. 2, 1937 |
| 2,158,228 | Forss | May 16, 1939 |
| 2,373,842 | Mitchell | Apr. 17, 1945 |